United States Patent [19]

Kataoka

[11] Patent Number: 4,621,892
[45] Date of Patent: Nov. 11, 1986

[54] LIGHT SCANNING DEVICE USING LENSES

[75] Inventor: Keiji Kataoka, Kawagoe, Japan

[73] Assignees: Hitachi, Ltd.; Hitachi Koki Co., Ltd., both of Tokyo, Japan

[21] Appl. No.: 550,584

[22] Filed: Nov. 10, 1983

[30] Foreign Application Priority Data

Nov. 10, 1982 [JP] Japan ................... 57-198272

[51] Int. Cl.[4] .................. G02B 3/02; G02B 26/10
[52] U.S. Cl. .................................... 350/6.3; 350/432
[58] Field of Search ....................... 350/6.3, 432

[56] References Cited

U.S. PATENT DOCUMENTS

| | | | |
|---|---|---|---|
| 1,810,598 | 6/1931 | Cummings | 350/6.3 |
| 2,531,956 | 11/1950 | Waldorf et al. | 350/432 |
| 3,036,491 | 5/1962 | Schier | 350/6.3 |
| 4,383,755 | 5/1983 | Fedder et al. | 350/6.8 |

Primary Examiner—John K. Corbin
Assistant Examiner—Rebecca D. Gass
Attorney, Agent, or Firm—Antonelli, Terry & Wands

[57] ABSTRACT

A light scanning device for reading or writing information by irradiating laser light onto a scanning plane. The light scanning device comprising a light source for irradiating the scanning plane with laser light along an optical path, and a rotating disc with at least one lens having at least one aspheric surface disposed in the optical path of the laser light irradiated from the light source for providing a microlight spot forming a light scanning line on the scanning plane.

16 Claims, 20 Drawing Figures

(MERIDIONAL PLANE)

(SAGITTAL PLANE)

LIGHT SCANNING DEVICE USING LENSES

BACKGROUND OF THE INVENTION

The present invention relates to a light scanning device utilizing at least one lens for scanning a plane by irradiating the plane with laser light.

An optical scanning system utilizing a rotating polygonal mirror as shown in FIG. 1 is known for use in light scanning devices such as a laser printer, laser reader and the like. A rotating polygonal mirror 1 rotates in the direction indicated by an arrow A and effects scanning of a laser light 4 on a screen 3. A lens 2 is arranged in the optical path for focusing the laser light into a minute light spot. The rotating polygonal mirror 1 consists of a plurality of highly polished mirror facets or sections 1—1. However, the polishing precision and the directional precision of each mirror facet with respect to the rotational axis must be kept high, which inevitably results in high cost for the device.

It is also known to dispose a hologram on a rotating disc as described, for example, in "HOLOGRAMPHIC GRATING SCANNERS WITH ABERRATION CORRECTIONS", by W. H. Lee, Applied Optics Vol. 16, No. 5, pg. 1,392 (1977). However, the hologram with a rough or rugged surface which is somewhat problematical generally has a low diffraction efficiency at about 30% or below. Although a volume hologram is high in diffraction efficiency, dichromated gelatine is generally used for its structural material and has a weak or small dampness property which is unacceptable for handling purposes.

SUMMARY OF THE INVENTION

The present invention, therefore, has as its object to provide an inexpensive light scanning device which is high in efficiency and easy to handle by overcoming the above-mentioned problems of conventional light scanning devices.

In accordance with the present invention, at least one lens is disposed for movement through an optical path of laser light so as to serve a light scanning device for scanning laser light with at least one facet of the lens having an aspheric surface so that the scanning laser light can be focused into a minute light spot. More particularly, a plurality of such lenses are disposed on a rotating disc so as to be successively inserted in the optical path. An inexpensive light scanning device high in optical availability is obtainable through use of such a lens in the form of a plastic lens which can be mass-produced on a mold through a copying process.

DETAILED DESCRIPTION OF THE PREFERRED EMBODIMENTS

A basic principle of the present invention will be first described before describing the embodiments of the present invention.

Figure 1:
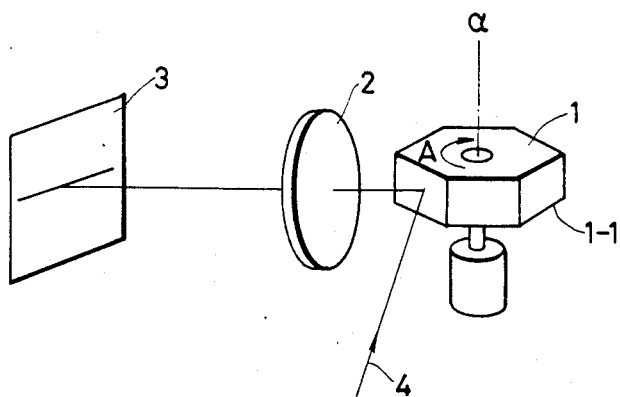
FIG. 1 is a perspective view representing one example of a conventional light scanning device.
Figure 2:
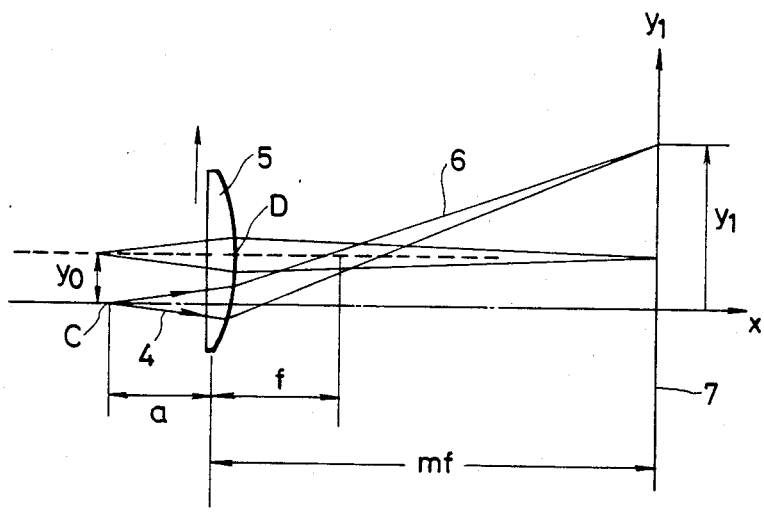
FIG. 2 is a drawing representing displacement of a point of image formation on a screen when incident light is displaced from an optical axis.

FIG. 2 shows a relationship upon which this invention is based. FIG. 2 illustrates the case where a lens 5 having an object point at C and disposed on a rotating disc has laser light 4 incident thereon with a being the distance between lens 5 and object point C. Assuming that the center of a lens 5 is D and the lens 5 is displaced in the direction y by $y_0$ from an optical axis of the incident laser light, then a point of image formation of a laser light 6 coming out of the lens 5 on a screen 7 is approximately:

$$y_1 = m\, y_0.$$

In this figure, f denotes a focal length of the lens 5, and a distance between the lens 5 and the screen 7 is denoted by mf. Accordingly, a light scanning line having a width extended m times as large as a translation of the lens 5 will be obtainable on the screen 7. In other words, a light scanning device is provided which will realize extensive range scanning from a small lens translation $y_0$. To effect translation of the lens, the disc upon which the lens is disposed is rotated. A plurality of lenses may be disposed on the disc on the same circumference as the disc or may be disposed in the manner of a spiral.

Figure 3:
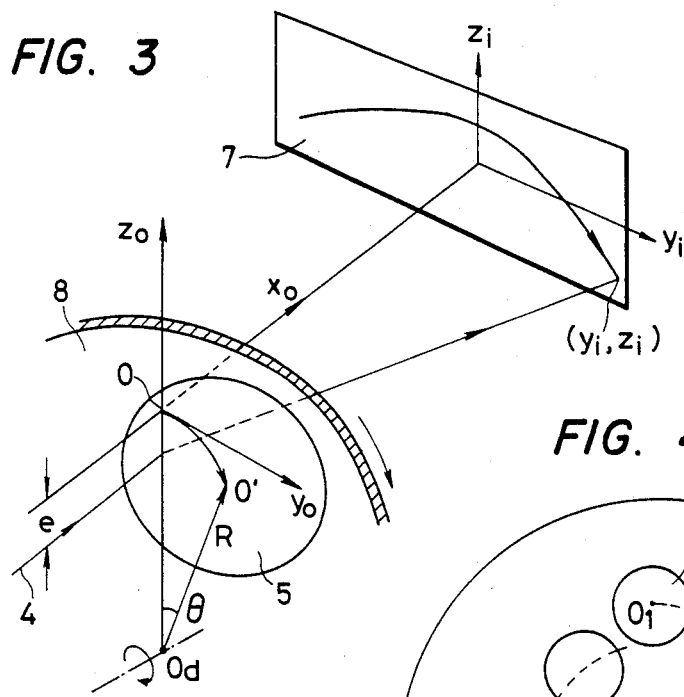
FIG. 3 shows a light scanning characteristic when laser light is incident on a lens on a rotating disc.

FIG. 3 illustrates a light scanning characteristic obtained when the laser light 4 is incident on the lens 5 on a disc 8 and the disc is rotated.

Assuming that the lens 5 rotates at an angle $\theta$ about the center Od of the disc 8, then the center of the lens 5 moves to O' from O. The incident laser light is deviated in this case by a deviation amount from e point O.

Scanning points (Yi, Zi) on an image plane 7 can be obtained through the following expressions:

$$Y_i = mR \sin \theta \qquad (1)$$

$$Z_i = (1-m)e - mR(1-\cos\theta) \qquad (2)$$

where R is a distance from the rotational center Od of the disc to the lens center.

As shown in the expression (2), $Z_i$ is a function of $\theta$, therefore, the scanning line is not linear, but rather is as shown in FIG. 3. When a plurality of lenses of a characteristic are disposed along on the same circumference or the rotating disc, e becomes constant to all the lenses in the expression (2). Therefore, light scanning lines of each lens are curved, but come on the same point.

For generating an almost linear light scanning line, it is effective to dispose a cylindrical lens between the disc and the image plane. The characteristic thus obtained will be described later.

Figure 4:
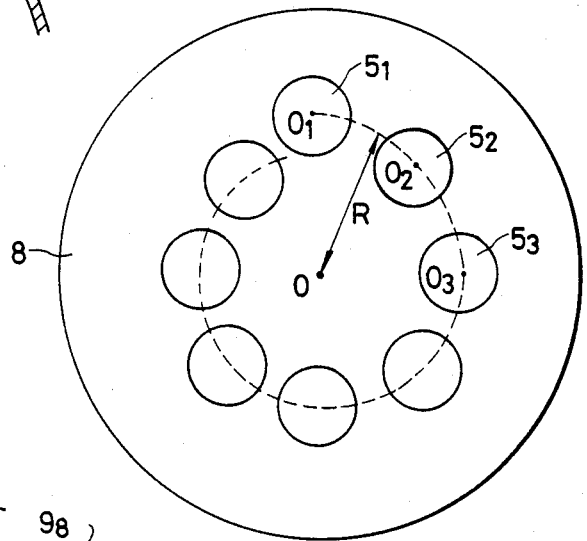
FIG. 4 illustrates a plurality of lenses disposed spirally on a rotating disc.
Figure 5:
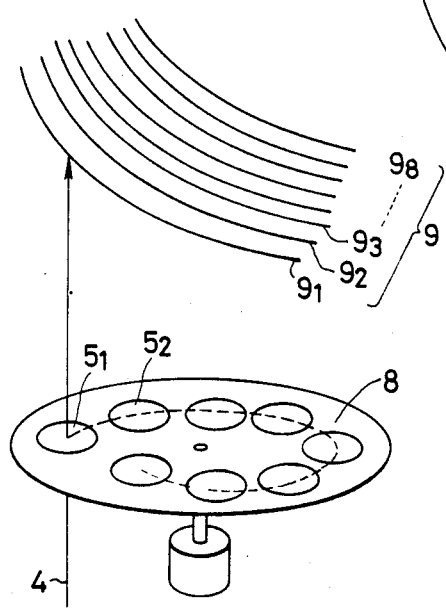
FIG. 5 shows a two-dimensional light scanning pattern obtainable through irradiating laser light on the disc.

FIG. 4 illustrates the case where the lenses are disposed spirally along the disc. Centers $O_1$, $O_2$ ... of the lenses $5_1$, $5_2$ ... are disposed on a spiral curve with a distance R from the rotational center O of the disc continuously changing. FIG. 5 represents a two-dimensional light scanning pattern 9 obtainable by irradiating the rotating disc 8 shown in FIG. 4 with the laser light 4. Scanning lines $9_1$, $9_2$, $9_3$ ... are each generated when the disc rotates and the lenses $5_1$, $5_2$, $5_3$ ... are irradiated sequentially by the laser light 4.

For a light scanning device using lenses for scanning a sufficiently minute light spot on the image plane at a predetermined scanning width, the lenses disposed on the disc must have a desired characteristic. A simple constitution is desirable for each lens disposed on the rotating disc. Therefore, the present invention employs a single lens. However, as will be described together with detailed examples given later, a single lens with a spherical surface configuration is not capable of providing the desired characteristic. Consequently, the present invention utilizes a single lens with at least one facet having an aspheric surface.

EXAMPLES

Figure 6:
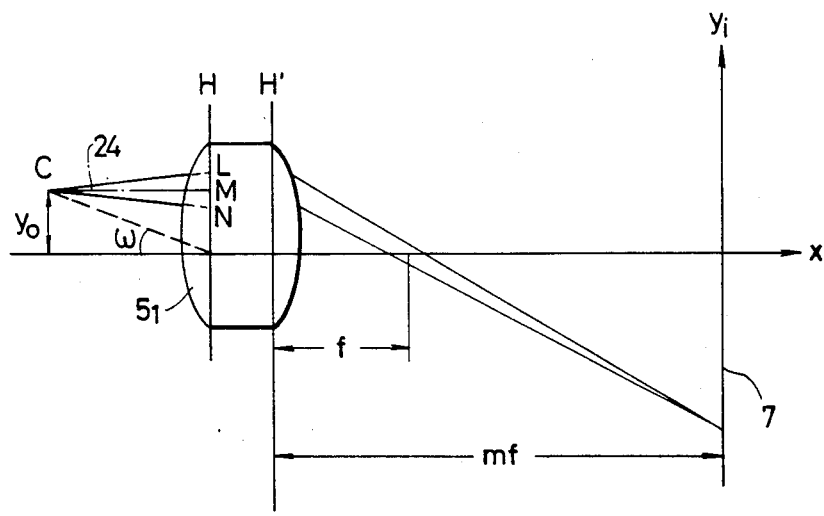
FIG. 6 and FIG. 7 are drawings for determining the configuration of a lens used on a light scanning device.
Figure 7:
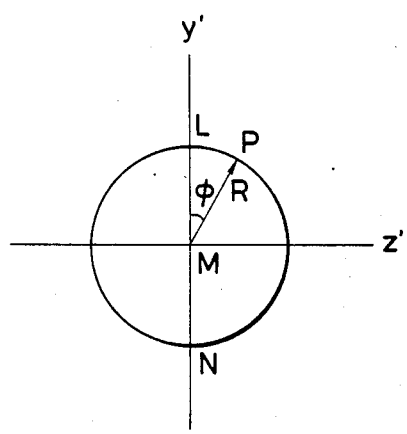

The present invention is now described in detail with respect to different embodiments as follows:

First, a lens configuration to be used on the light scanning device is determined according to FIG. 6. In FIG. 6, it is assumed that an object point C is displaced in the direction y by $y_0$ from an optical axis x of the lens $5_1$. In this case, a half field angle is given at $\omega$. A light pattern irradiating a principal plane H on the object side of the lens $5_1$ is shown in FIG. 7. In FIG. 7, y' and x' are axes provided about an intersection M of a principal ray 24 of the light irradiating the principal plane H on the object side of the lens $5_1$. An incident point P of the laser light onto the H plane is indicated by polar coordinates as $(R, \phi)$.

When an F number for converging or focusing a diametral light spot of 200 μm on the screen 7 is set at F=250, a beam radius R of the principal plane H on the object side of the lens $5_1$ can be given by the following expression:

$$\frac{mf}{2R} = 250$$

In the optical system shown in FIG. 6, lateral aberrations $\Delta y$, $\Delta z$, of the ray in the meridional direction (y direction) and the sagital direction (z direction) by the third order aberration expansion can be given by the following expressions:

$$\Delta y = -\frac{1}{2\alpha'} \{IR^3 \cos \phi + II \tan \omega R^2(2 + \cos 2\phi) + \quad (3)$$

$$(3III + P) \tan^2\omega R \cos \phi + V \tan^3\omega\}$$

-continued $$\Delta z = -\frac{1}{2\alpha'} \{IR^3 \sin \phi + II \tan \omega R^2 \sin 2\phi + \quad (4)$$

$$(III + P) \tan^2 \omega R \sin \phi\}$$

where I is a spherical aberration, II is a coma aberration, III is an astigmatic aberration, P is a Petzbar sum, V is a distortion aberration, and $\alpha'$ is a coefficient.

Provided $\Delta y$, $\Delta z$ can be allowed within limits of 200μ, values of the permitted aberration coefficients I, II, III will be obtained. (Exerting no influence on resolution, the distortion aberration V is neglected.) With lens focal length f=60 mm, scanning magnification m=10, half field angle $\omega = 10°$, and F=250, then the above coefficient $\alpha'$ is given approximately at $1/mf$. With f=1 as the result, the values are indicated in the form normalized as follows:

$$|I| \leq 41.67 \quad (5)$$

$$|II| \leq 1.6 \quad (6)$$

$$|III| \leq 0.18 \quad (7)$$

From the above result, since the allowable limit of spherical aberration I is large, it is considered that coma aberration II, astigmatic aberration III will satisfy the following expressions:

$$II = 0 \quad (8)$$

$$III = 0 \quad (9)$$

Figure 8:
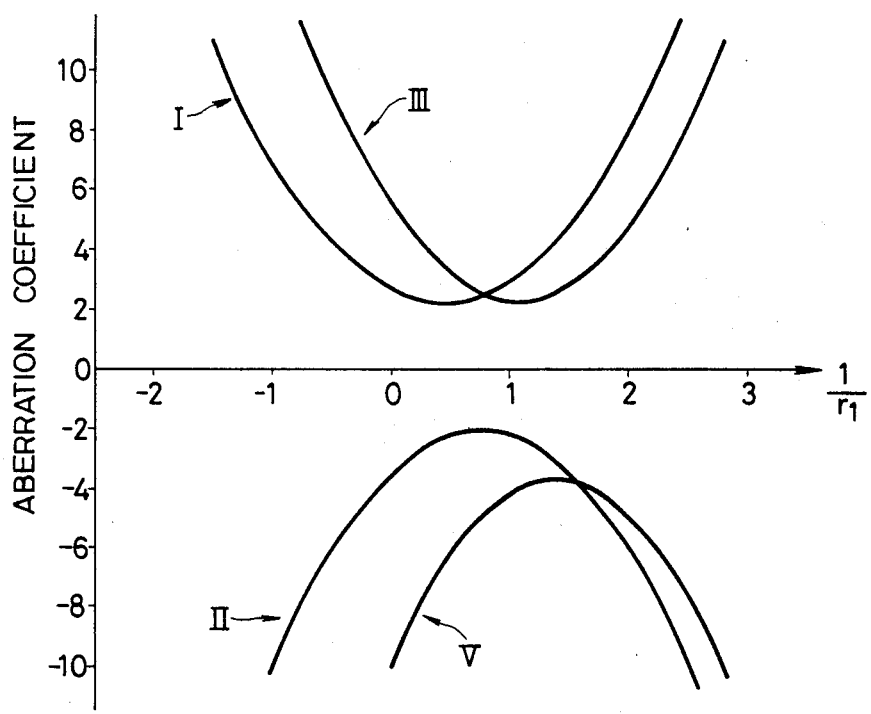
FIG. 8 illustrates curves representing an aberration coefficient when the surface configuration of a thin lens is changed.

FIG. 8 shows a result obtained by calculating a value of the aberration coefficient from aberration theory when the surface configuration of a single thin lens or a virtual lens in the thickness placed in media in refractive index 5 consisting of a spherical surface is changed. In the drawing, $\gamma_1$ is a radius of curvature on the front side of lens, and the lens focal length is normalized at 1. From the drawing, it is understood that the coma aberration II and the astigmatic aberration III do not satisfy the target specification expressions (6), (7) totally.

Figure 9:
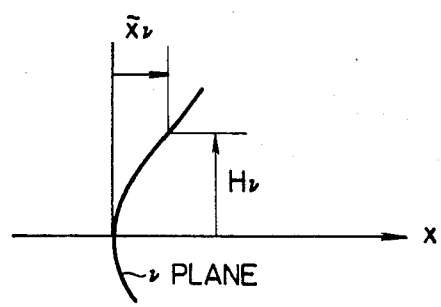
FIG. 9 illustrates an aspheric surface configuration of a lens.

To overcome the above problem, the present invention employs an aspheric surface for the lens configuration. An aspheric surface $\nu$ can be given by the following expression (10) or (11) according to the definition shown in FIG. 9:

$$\tilde{x}_\nu = \tilde{\gamma}_\nu \left\{ 1 - \frac{H_\nu^2}{\gamma_\nu^2} \right\}^{\frac{1}{2}} + A_\nu H_\nu^2 + B_\nu H_\nu^4 \quad (10)$$

However, in FIG. 6, with a vertex of the lens as the origin, coordinates on the lens surface are $(X\tilde{}_\nu, Y\tilde{}_\nu, Z\tilde{}_\nu)$. In the expression (10), further, $H_\nu^2 = Y\tilde{}^2_\nu + z\tilde{}^2_\nu$, and $A_\nu$, $B_\nu$ are aspheric coefficients giving a discrepancy from a reference sphere, $\gamma\tilde{}_\nu$ is a radius of curvature of the aspheric surface $\nu$.

$$\tilde{x}_\nu = \frac{1}{2\gamma_\nu} H_\nu^2 + \frac{1}{8}\left(\frac{1}{\gamma_\nu^3} + b_\nu\right) H_\nu^4 \quad (11)$$

where $\gamma_\nu$ is a paraxial radius of curvature, $b_\nu$ is an aspheric coefficient, and there holds the following relation between parameters of the expressions (8) and $$\frac{1}{\overline{\gamma}_\nu} = \frac{1}{\gamma_\nu} + 2A_\nu \quad (12)$$

$$b_\nu = 8B_\nu - 2A_\nu \left(4A_\nu^2 + 3\frac{1}{\gamma_\nu}\frac{1}{\overline{\gamma}_\nu}\right) \quad (13)$$

Proper coefficients $U_0$, $B_0$ and $P_0$ of the single thin lens can be written as follows:

$$U_0 = \left(\frac{N}{N-1}\right)^2 - \left(\frac{2N+1}{N-1}\right)\frac{1}{\gamma_1} + \frac{N+2}{N}\cdot\frac{1}{\gamma_1^2} \quad (14)$$

$$B_0 = \left(\frac{N}{N-1}\right) + \frac{N+1}{N}\cdot\frac{1}{\gamma_1} \quad (15)$$

$$P_0 = \frac{1}{N} \quad (16)$$

where N represents a refractive index of material constituting the lens, and $\gamma_1$ represents a paraxial radius of curvature of the front side surface of the single lens. The third order aberration coefficients of the coma aberration II and the astigmatic aberration III of the optical system will be expressed by means of the above proper coefficients as follows:

$$II = a_{II}U_0 + b_{II}B_0 + a_{II}\psi = 0 \quad (17)$$

$$III = a_{III}U_0 + b_{III}B_0 + C_{III} + a_{III}\psi = 0 \quad (18)$$

where $a_{II}$, $b_{II}$, $C_{II}$, $a_{III}$, $b_{III}$, $C_{III}$ are constants, and $\psi$ is a parameter representing a spherical surface, which can be given by the following expression:

$$\psi = \sum_{\nu=1}^{2} (N_\nu' - N_\nu)b_\nu \quad (19)$$

where $N_\nu'$ and $N_\nu$ are refractive indexes of media of the rear side and the front side, respectively, of the single thin lens.

The number of aspheric surfaces may be one or two, and the independent variable is $\psi$ given by the above expression (19). Then, the above proper coefficient $U_0$ is dependent to $B_0$. An elimination of $\nu_1$ from the expressions (14) to (16) leaves:

$$U_0 = \frac{N(N+2)}{(N+1)^2}B_0^2 + \frac{N}{(N+1)^2}B_0 + \frac{N^3}{(N-1)^2(N+1)^2} \quad (20)$$

Accordingly, independent variables to determine the coma aberration II and the astigmatic aberration III are $\psi$ and $B_0$. Now, if target values of the coma aberration II and the astigmatic aberration III are $II_0$, $III_0$, respectively, a configuration of the aspheric lens can be calculated as follows:

$$B_0 = \frac{(a_{III}II_0 - a_{II}III_0) - (a_{III}C_{II} - a_{II}C_{III})}{a_{III}b_{II} - a_{II}b_{III}} \quad (21)$$

$$\psi = \frac{III_0 - (a_{III}U_0 + b_{III}B_0 + C_{III})}{a_{III}} \quad (22)$$

$$\frac{1}{\gamma_1} = \left(B_0 + \frac{N}{N-1}\right)\left(\frac{N}{N+1}\right) \quad (23)$$

With $II_0=0$, $III_0=0$ in the above expressions, from calculating a solution with a refractive index N at $1.4 \leq N \leq 1.9$ and a scanning magnification m at $2 \leq m \leq 30$, the following result is obtainable. However, a focal length of the lens is set at 1.

$$0.4165 \leq \frac{1}{\gamma_1} \leq 1.5417 \quad (24)$$

$$-3.0191 \leq \psi \leq -0.7058 \quad (25)$$

Specifications of the lenses $5_1$, $5_2$ ... of the above-mentioned apparatus according to the above result are as follows:

| | |
|---|---|
| Focal length | f = 60 mm |
| Scanning magnification | m = 10 |
| Laser wavelength | λ = 0.633μ (Helium neon laser) |
| F number | F = 250 |
| Material | Acrylic resin (Refractive index N = 1.4885) |
| Radius of curvature | $Y_1^\sim$ = 54.2564 |
| | $Y_2^\sim$ = −37.9419 |
| Aspheric coefficient | $A_1$ = 0 |
| | $A_2$ = 0.45833 × $10^{-2}$ |
| | $B_1$ = 0 |
| | $B_2$ = 0.48729 × $10^{-5}$ |
| Lens thickness | d = 14.4492 mm |

When normalized at f=1, the above $1/\gamma_1$ and $\psi$ will be as follows:

$$\frac{1}{\gamma_1} = 1.1059$$

$$\psi = -2.7175$$

Figure 10:
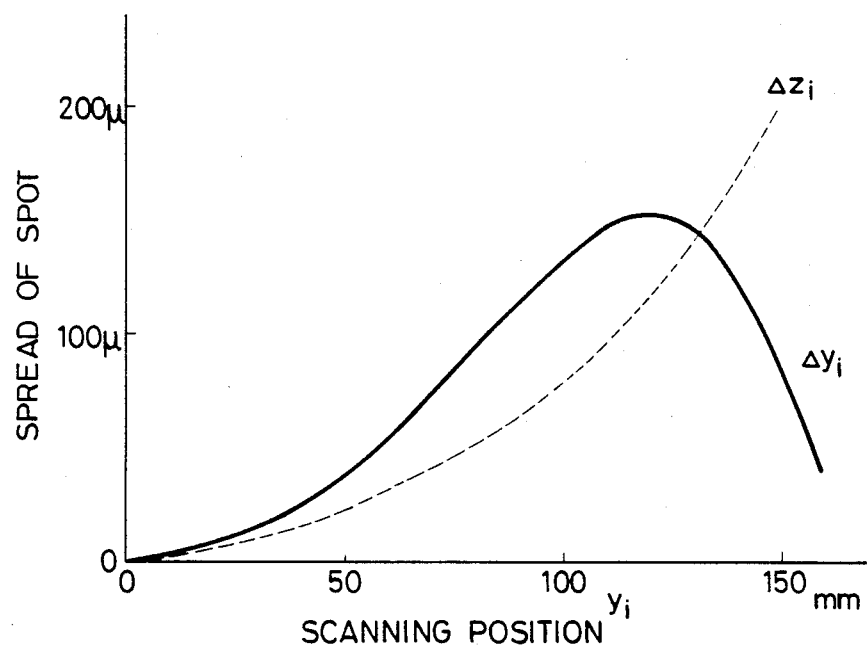
FIG. 10 illustrates curves representing a spread of a spot to a screen scanning point when the lens configuration is determined.

Features the above lenses $5_1$, $5_2$, ... are shown in FIG. 10. In the drawing, $\Delta y_i$ indicates a spot spread in the direction y, $\Delta z_i$ indicates a spot spread in the direction z, and it will be understood that a scanning as far as 300 mm max. can be effected efficiently on the screen, if the spot spread is allowed as far as 200μ, as described.

Figure 11:
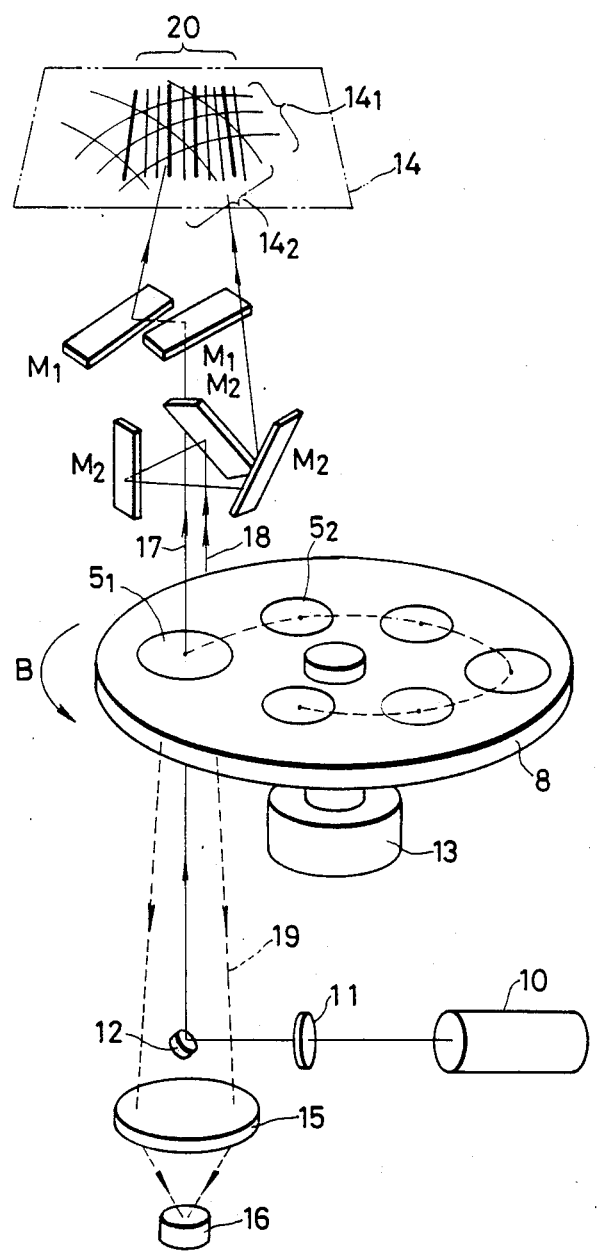
FIG. 11 is a perspective view representing one embodiment of this invention.

FIG. 11 represents a laser reader employing the light scanning device using lenses given in one embodiment of this invention.

In the drawing, 10 denotes a laser source, 11 denotes a lens, 12 denotes a mirror, 8 denotes a disc holding aspheric lenses $5_1$, $5_2$, ... (hereinafter simply called "lenses $5_1$, $5_2$, ... "), 13 denotes a motor for rotating the disc 8 in the direction indicated by an arrow B, 14 denotes a scanned plane, 15 denotes an optical element condensing a scattered light 19 from the scanned plane 14, and 16 denotes a light detector.

A bar code 20 to be read and others are disposed on the scanned plane. The bar code is checkered as illustrated and indicated on the surface of a product package, for example, recording a name of the product and a date of manufacture therein.

A net two-dimensional light scanning is carried out, as illustrated, on the scanned plane 14 by rotations of the disc, therefore a slight dislocation of the bar code arrangement does not exert an influence on the laser reading.

The lenses $5_1$, $5_2$, ... used on this example are those which are configured in the above-mentioned example. Then, the lenses $5_1$, $5_2$, ... are disposed spirally on the disc as illustrated in FIG. 4 and FIG. 5.

A laser light irradiated from the laser source 10 develops to a diverging light beam through the lens 11 and is then incident on lenses $5_{1'}$, $5_{2'}$, ... on the disc 8 through the mirror 12. The lenses $5_{1'}$, $5_{2'}$, ... are disposed spirally on the disc 8, as described hereinabove, therefore a two-dimensional light scanning pattern shown in 9 of FIG. 5 is obtained. However, mirrors M1, M2 shown in FIG. 11 divide the two-diminsional light scanning pattern in half. More specifically, half of the laser light subjected to two-dimensional light scanning is reflected by the mirror M1 as represented by 17 to a scanning pattern $14_1$, and the remaining half is reflected by the mirror M2 as represented by 18 to a scanning pattern $14_2$. Consequently, a net two-dimensional light scanning pattern is obtained on the image plane 14 as shown in FIG. 11.

What is more important in the apparatus is that the lenses $5_1$, $5_2$, ... have the one surface formed aspheric as mentioned hereinabove so that each scanning laser beam is capable of constituting a microlight spot with less spread. Thus, the bar code 20 placed on the scanned plane 14 has its scattered light 19 condensed on the light detector 16 by the optical component 15 and is detected with precision.

A light scanning device using lenses of this invention which operates for generating a linear light scanning line on a scanned plane will now be described in detail.

Figure 12:
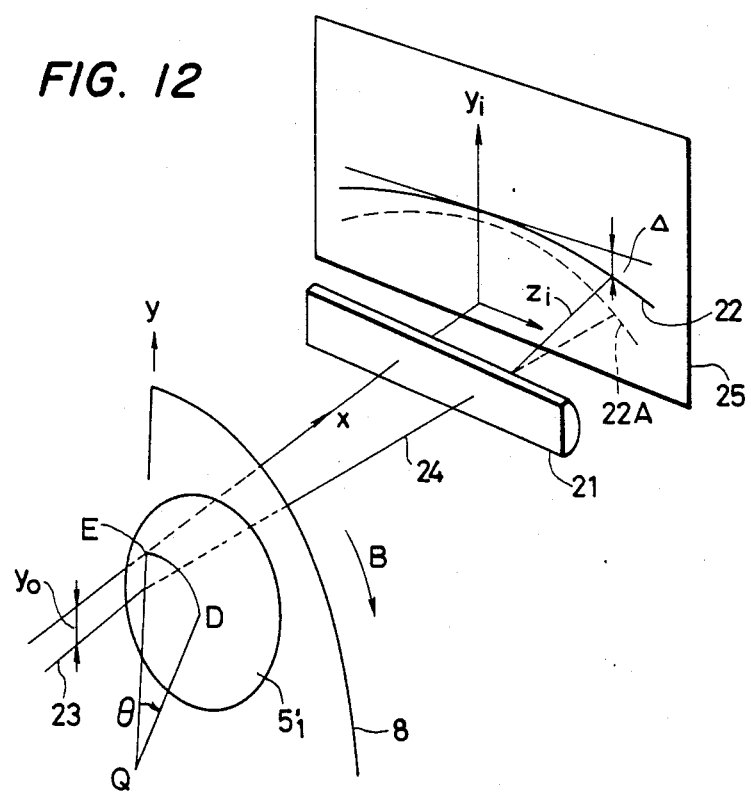
FIG. 12 illustrates the correction of a scanning line bend of the lens disposed on a rotating disc.

As illustrated in FIG. 3, the scanning line of lenses disposed on a rotating disc is curved. To correct the curve and, thus, to obtain a light scanning line on the almost straight line, a cylindrical lens 21 having a convex surface is disposed, as shown in FIG. 12, between the disc 8 and the image plane 25. A distance between the cylindrical lens and the image plane is set near a focal length of the cylindrical lens. Assuming that the lens $5_1$, rotates in angle $\theta$ about the disc center Q, then the center of the lens $5_1$ moves from E to D. The incident laser light 24 is set at a point $Y_0$ displaced from E.

When the disc 8 rotates in the direction indicated by an arrow B, the light scanning line should be curved as shown in a broken line 22A, if the cylindrical lens 21 is not provided. However, the light scanning line has its position corrected substantially as shown in a continuous line 22. The light scanning line is made linear through the cylindrical lens having a convex surface, because even an incident beam of light deviating from an axis of the cylindrical lens can be condensed near a focal line of the cylindrical lens by the property of the cylindrical lens.

A value of the above-mentioned $Y_0$ and a distance between the cylindrical lens 21 and the screen 25 is adjusted to minimize a curve of the scanning line. However, the light scanning line shown in a continuous line 22 is not perfectly linear, but retains a small deviation of A as a maximum.

Figure 13:
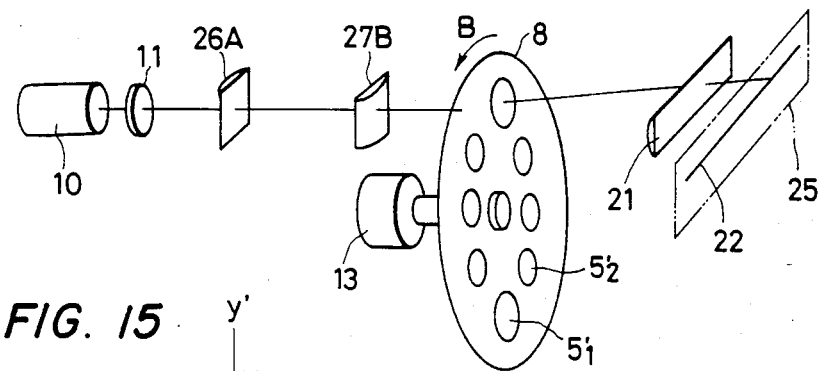
FIG. 13 is a perspective view representing another embodiment of this invention.

FIG. 13 represents a light scanning device using lenses according to this invention, which enables a linear light scanning. This figure differs from that of FIG. 11 in that a cylindrical lens is disposed between the light scanning device and the scanned plane so as to enable a linear scanning type in this embodiment. Cylindrical lenses 26A, 26B are disposed in an optical path of the laser light irradiated from the laser source 10, and a cylindrical lens 21 is disposed between the lenses $5_{1'}$, $5_{2'}$, ..., which are arranged on the same circumference or different concentric circles along the disc 8, and the scanned plane 25 at a spot where the lens working axis is substantially parallel to the scanning line.

With an arrangement as illustrated in FIG. 13, the laser light irradiated from the laser source 10 passes the lens 11 and the cylindrical lenses 26A, 26B and is incident on the lenses $5_{1'}$, $5_{2'}$, ... on the disc 8. The beam having diverged through the lens 11 is changed only for divergence in the direction of the scanning line by the two cylindrical lenses 26A, 27B with the working axes arranged almost in parallel with each other, becomes parallel consequently, and is incident on the lens 5 as a beam diverging only vertically as shown in FIG. 8. The light coming out of the lenses $5_{1'}$, $5_{2'}$, ... is condensed vertically by the cylindrical lens 21 and develops to a microlight spot to form an almost linear light scanning line 22 on the scanned plane 25.

Figure 15:
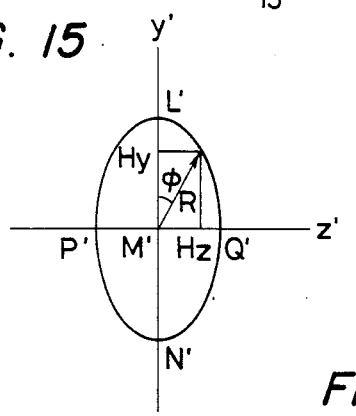
FIG. 14 and FIG. 15 are drawings for determining a configuration of the lens used on a light scanning device in accordance with another embodiment of this invention.

The configuration of the lenses $5_{1'}$, $5_{2'}$, ... used on the apparatus of this embodiment will be described in detail as follows:

The optical system shown in FIG. 13 is observed by referring to drawings taken from the meridional plane and the sagital plane as shown in FIG. 14. A light pattern irradiating a principal plane $H_I$ on the object side of the lens $5'$ is shown in FIG. 15. Here, $y'$ indicates a meridional direction, $z'$ indicates a sagital direction, and an intersection $M'$ of the principal ray and the principal plane $H_I$ of object side workds as an original. $H_l$, denotes a principal plane on the image side of the lens $5_{1'}$. A beam width 2 $H_y$ in the direction $y'$ is set on the screen 25 as focused with 125 in F number. On the other hand, a beam width 2 $H_z$ in the direction $z'$ cannot be focused with precision on the lens $5_{1'}$ due to an influence of diffraction and is thus set so that the beam coming out of the lens $5_{1'}$ will become a parallel beam essentially.

Figure 14A:
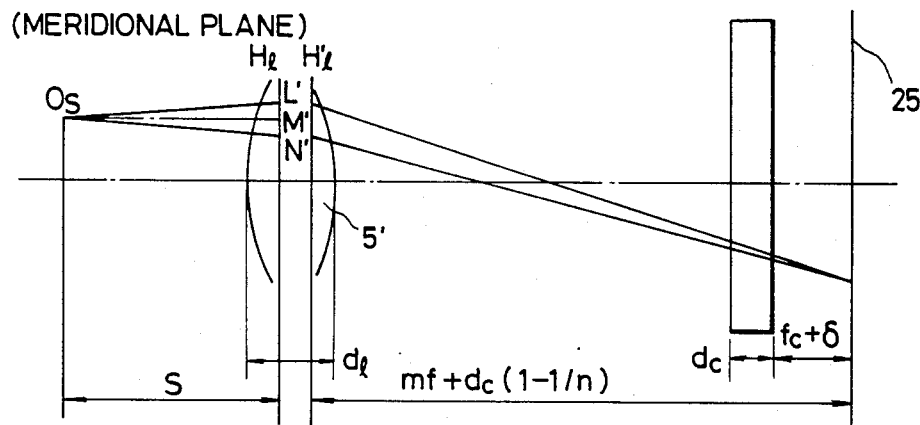
Figure 14B:
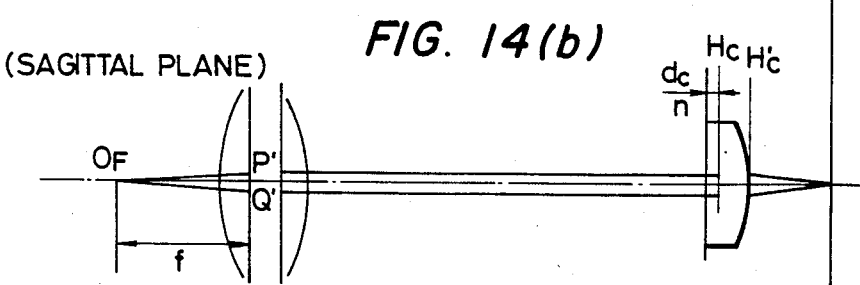

A diverging point $O_F$ of the laser light shown in FIG. 14(b) is realized by lens 11 of the optical system shown in FIG. 13. $O_S$ shown in FIG. 14(a) is obtained by lens 11, and cylindrical lenses 26A, 27B of the optical system of FIG. 13. A parameter S in FIG. 14 is set by the following equation:

$$\frac{1}{S} = \frac{1}{mf} = \frac{1}{f} \qquad (26)$$

Assuming a focal length of the lens $5_{1'}$ if f and a distance between the lens $5_{1'}$ and the screen is 25 mf, $H_y$ and $H_z$ can be given by the following expressions:

$$\frac{mf}{2H_y} = 125$$

$$\frac{mf}{2H_z} = 125$$

Here, provided lateral aberrations $\Delta_y$, $\Delta_z$ (expressions (1) and (2)) of beams of light in the meridional direction (direction y) and the sagital direction (direction z) by the above mentioned third order aberration expansion coefficient can be allowed as far as $100\mu$ ($\pm 50\mu$), values of each aberration coefficient will be obtained. For a lens focal length f=65 mm, scanning magnification $m=10$, half field angle $\omega=10°$, $F=125$, and the result will be given in $$|I| \leq 2.4 \tag{27}$$

$$|II| \leq 0.18 \tag{28}$$

$$|3III + P| \leq 0.124 \tag{29}$$

$$|III + P| \leq 1.24 \tag{30}$$

Then, the distortion aberration V is neglected as in the case given hereinabove. From the above result, since spherical aberration I and III aberration are large in allowance, it is conceived that coma aberration II and $3III + P$ aberration will satisfy the following expressions:

$$II = 0 \tag{31}$$

$$III = -\frac{P}{3} \tag{32}$$

The lens is an aspheric single lens as in the previous case. Then in the expressions (21) to (23), when a solution is calculated with $II_0=0$, $III = -P/3$, the refractive index N being $1.4 \leq N \leq 1.9$ and scanning magnification m being $5 \leq m \leq 30$, the following result will be obtained in normalized form with focal length of the lens being 1.

$$0.5270 \leq \frac{1}{\gamma_1} \leq 1.3528 \tag{33}$$

$$-2.9058 \leq \psi \leq -0.8203 \tag{34}$$

Specifications of the lenses $5_{1'}$, $5_{2'}$, according to the result are as follows:

| | |
|---|---|
| Focal length | $f = 65$ mm |
| Scanning magnification | $m = 10$ |
| Laser wavelength | $\lambda = 0.633\mu$ (Helium neon laser) |
| F number | $F = 125$ |
| Material | Glass (BK 7, refractive index $N = 1.5152$) |
| Radius of curvature | $Y_1\tilde{} = 62.2343$ |
| | $Y_2\tilde{} = -47.9658$ |
| Aspheric coefficient | $A_1 = 0$ |
| | $A_2 = 0.30825 \times 10^{-2}$ |
| | $B_1 = 0$ |
| | $B_2 = 0.26808 \times 10^{-5}$ |
| Lens thickness | $d_l = 11.0955$ mm |

As for the cylindrical lens 21:

| | |
|---|---|
| Focal length | $f_0 = 65$ mm |
| Material | Glass (BK 7, refractive index $N = 1.5152$) |
| Lens thickness | $d_o = 6.5$ mm |

Figure 16:
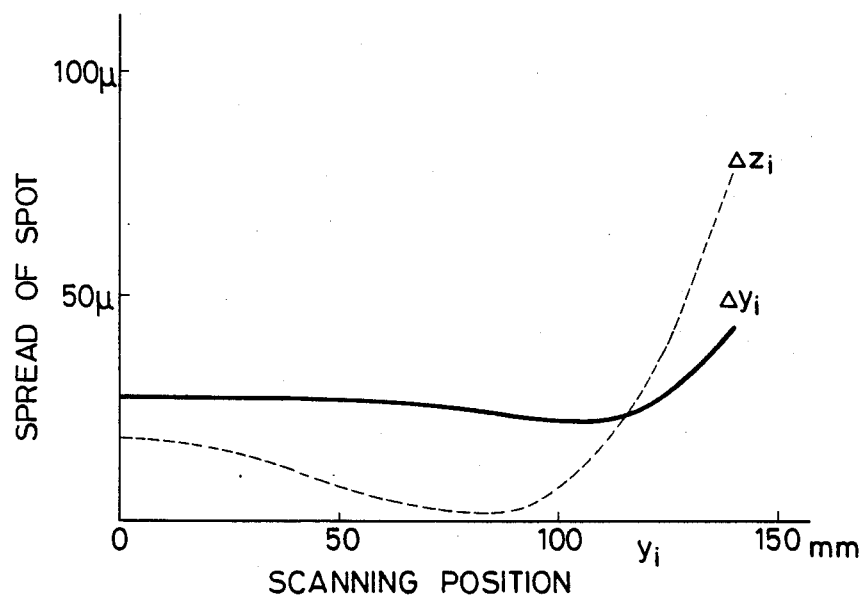
FIG. 16 to FIG. 19 illustrate curves representing a spread of spot to screen scanning point in accordance with another embodiment.
Figure 17:
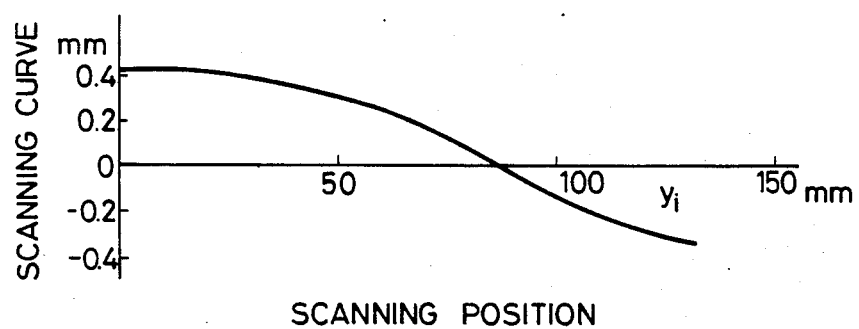

A characteristic of the light scanning device using these lenses and cylindrical lens is shown in FIG. 16 and FIG. 17.

Where the material is acrylic resin (refractive index $N=1.4885$), specifications of the lenses $5_{1'}$, $5_{2'}$ will be as follows: (Points different from the above are given.)

| | |
|---|---|
| Radius of curvature | $Y_1\tilde{} = 59.2522$ |
| | $Y_2\tilde{} = -48.8494$ |

| | -continued |
|---|---|
| Aspheric coefficient | $A_1 = 0$ |
| | $A_2 = 0.24669 \times 10^{-2}$ |
| | $B_1 = 0$ |
| | $B_2 = 0.27914 \times 10^{-5}$ |
| Lens thickness | $d_l = 10.699$ mm |

Figure 18:
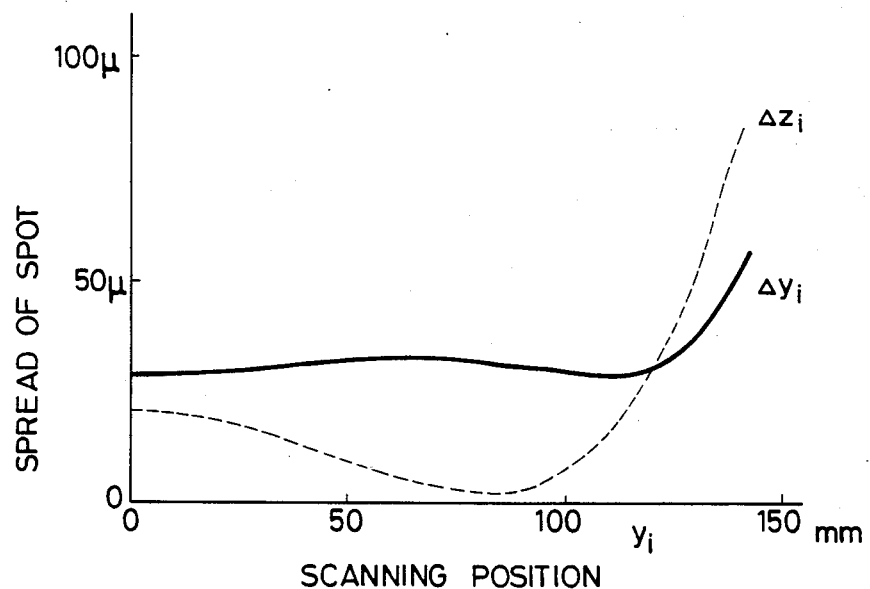
Figure 19:
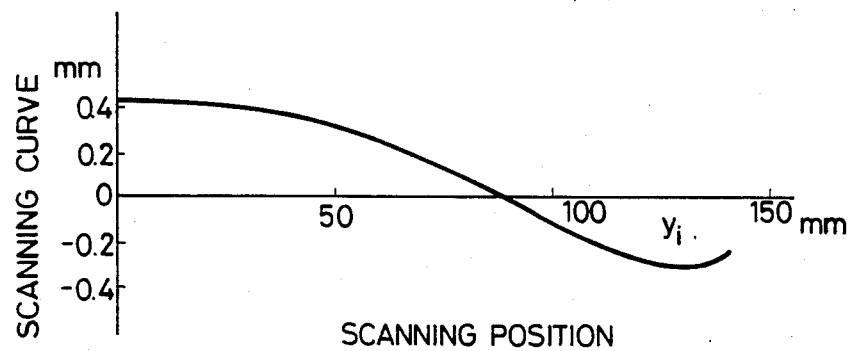

A characteristic of the light scanning device using these lenses is given in FIG. 18 and FIG. 19.

As shown in FIG. 16 and FIG. 17, if the spot spread is allowed as far as $100\mu$, a scanning as far as 300 mm max. can be effected efficiently on the screen.

The aspheric lens used in each embodiment above are formed of plastic as in the case of the disc on which the lenses are disposed. Therefore, the lens can be easily copied and mass produced in large quantities so as to provide an expensive supply.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What is claimed is:

1. A light scanning device comprising means for irradiating a plane to be scanned with laser light along an optical path, moving means disposed for movement with respect to the optical path of the laser light, and means for providing a microlight spot of the laser light forming a light scanning line on the scanning plane, said microlight spot means including at least one lens having at least one aspheric surface disposed on the moving means for continuous movement across the optical path of the laser light so as to provide the microlight spot of the laser light forming the light scanning line on the scanning plane.

2. A light scanning device according to claim 1, wherein the moving means includes a rotatable disc having the at least one lens disposed thereon and rotatable about an axis of rotation.

3. A light scanning device according to claim 2, wherein the irradiating means includes a laser light source and a diverging lens for diverging the laser light along the optical path toward the at least one lens having the at least one aspheric surface.

4. A light scanning device according to claim 2, wherein the at least one lens is provided with two aspheric surfaces.

5. A light scanning device comprising means for irradiating a plane to be scanned with laser light along an optical path, moving means disposed for movement with respect to the optical path of the laser light, and means for providing a nonspreading microlight spot of the laser light forming a light scanning line on the scanning plane, said microlight spot means including a plurality of lenses, each of the plurality of lenses having at least one aspheric surface disposed on the moving means for continuous movement across the optical path of the laser light so as to provide the microlight spot of the laser light forming the light scanning line on the scanning plane, the moving means including a rotatable disc having the plurality of lenses disposed thereon and rotatable about an axis of rotation, each lens having the at least one aspheric surface for preventing spreading of the microlight spot and being disposed on the rotatable disc.

6. A light scanning device according to claim 2 or 5, wherein the at least one lens having the at least one aspheric surface is configured to provide a diametral microlight spot on the scanning plane no greater than 200μ.

7. A light scanning device according to claim 5, wherein the plurality of lenses are disposed on the disc along a circumference having the same radius from the axis of rotation of the disc.

8. A light scanning device according to claim 3, wherein the aspheric surface of each lens has a confirguration comprising a paraxial radius of curvature $\gamma_1$ on a front side of the lens and a parameter $\psi$ indicating the aspheric surface configuration with a relationship:

$$0.4165 \leq \frac{1}{\gamma_1} \leq 1.5417$$

$$-3.0191 \leq \psi \leq -0.7058$$

for a focal length normalized at 1, where a refractive index N of the material constituting the lens is $1.4 \leq N \leq 1.9$, and a scanning magnification m is $2 \leq m \leq 30$.

9. A light scanning device according to claim 5 or 8, wherein the plurality of lenses are disposed on the disc along a spiral path having a varying radius from the axis of rotation of the disc.

10. A light scanning device according to claim 9, wherein a plurality of mirrors are disposed along the optical path of the laser light at positions having a predetermined relationship with respect to the disc.

11. A light scanning device according to claim 5, wherein the plurality of lenses are disposed on the disc along concentric circular paths with respect to the axis of rotation of the disc.

12. A light scanning device according to claim 11, wherein the at least one lens having the at least one aspheric surface is configured to provide a diametral microlight spot on the scanning plane no greater than 100μ.

13. A light scanning device according to claim 11, further comprising correcting means disposed in the optical path of the laser light between the rotatable disc and the scanning plane for correcting a curvature of the scanning line on the scanning plane.

14. A light scanning device according to claim 13, wherein the correcting means comprises a cylindrical lens.

15. A light scanning device according to claim 14, further comprising two cylindrical lenses disposed along the optical path of the laser light incident upon the plurality of lenses disposed on the disc.

16. A light scanning device according to claim 11 or 15, wherein the aspheric surface of each lens has a configuration comprising a paraxial radius of curvature $\gamma_1$ on the front side of the lens and a parameter $\psi$ indicating the aspheric surface configuration with a relationship:

$$0.5270 \leq \frac{1}{\gamma_1} \leq 1.3529$$

$$-2.9058 \leq \psi \leq -0.8203$$

for a focal length normalized at 1, where a refractive index N of the material constituting the lens is $1.4 \leq N \leq 1.0$, and a scanning magnification m is $5 \leq m \leq 30$.

* * * * *